United States Patent [19]
Crumley et al.

[11] Patent Number: 5,863,321
[45] Date of Patent: Jan. 26, 1999

[54] STRAIGHT-SHADE COATING COMPOSITIONS

[75] Inventors: Valerie L. Crumley, Monroe; Daniel W. Johnson, Ann Arbor, both of Mich.

[73] Assignee: BASF Corporation, Southfield, Mich.

[21] Appl. No.: 30,146

[22] Filed: Feb. 25, 1998

[51] Int. Cl.⁶ ..................................... C09C 1/62
[52] U.S. Cl. ..................... 106/404; 106/403; 428/403
[58] Field of Search ................... 106/403, 404; 428/403

[56] References Cited

U.S. PATENT DOCUMENTS

| | | | |
|---|---|---|---|
| 5,718,753 | 2/1998 | Suzuki et al. | 106/404 |
| 5,749,957 | 5/1998 | Kieser et al. | 106/404 |
| 5,766,335 | 6/1998 | Bujard et al. | 106/404 |

*Primary Examiner*—Mark L. Bell
*Assistant Examiner*—Scott L. Hertzog
*Attorney, Agent, or Firm*—Anne Gerry Sabourin

[57] ABSTRACT

The present invention provides a straight-shade color coating composition comprising a colored metallic flake pigment. The coating composition produces a coating having no apparent gonioapparent effects. The present invention may be used to prepare coatings with increased hiding power at the same color pigment-to-binder ratio or with the same hiding power but lower color pigment-to-binder ratio as compared to previous coating of equivalent hue. The present invention also provides coatings with higher chroma non-pastel colors and cleaner pastel colors as compared to previous coating compositions of equivalent hue.

37 Claims, No Drawings

STRAIGHT-SHADE COATING COMPOSITIONS

FIELD OF THE INVENTION

This invention concerns solid-color or straight-shade coating compositions, especially compositions for high-gloss topcoats, particularly for basecoats of color-plus-clear composite coatings.

BACKGROUND OF THE INVENTION

Topcoat coating compositions, predominantly curable (thermosettable) topcoat coating compositions, are widely used in the coatings art, notably in the automotive and industrial coatings industry. It is important for a topcoat to be durable and to protect the coated article or to aid underlying coating layers in protecting the coated article. A primary function of a topcoat, however, is to provide aesthetic appeal. The automotive industry has made extensive use of these coatings for automotive body panels, both as metallic colors and as straight shade colors. Color-plus-clear composite coatings are particularly useful as topcoats that provide exceptional gloss, depth of color, and distinctness of image.

Metallic colors are generally defined in the art as colors having gonioapparent effects. For example, the American Society of Testing Methods (ASTM) document F284 defines metallic as "pertaining to the appearance of a gonioapparent material containing metal flake." Metallic colors thus include special flake pigments, which may be metallic flake pigments like aluminum pigment or pearlescent flake pigments including treated micas like titanium dioxide- or iron oxide-coated mica pigments, to give the coatings a different look when viewed at different angles. Traditional metallic colors are lighter when viewed at an angle closer to the specular, commonly referred to as the flash angle, and darker when viewed at an angle significantly farther from the specular, commonly referred to as the flop angle. For example, metallic colors would appear lighter in value when viewed at angles of 5 to 15 degrees off specular and darker in value when viewed at angles 75 to 110 degrees off specular. This value difference, caused by the presence of the flake pigments in the coating, gives the coated article a generally metallic look. In addition to a value difference, a change in chroma or hue of the color may be observed in moving from a view at an angle close to specular to a view at an angle significantly off specular. Colored aluminums have been used in metallic coatings to modify the gonioapparent effects of a coating in this way or to increase the chroma of the coating.

Solid colors (or straight shade colors), on the other hand, are intended to have the same or nearly the same color from any angle and do not have an apparent metallic appearance. Straight shade colors have in the past not included any flake pigments at all. For example, ASTM E284 describes a solid color as "not containing flake or gonioapparent pigments." The solid colors rely on color pigments to make high chroma colors like reds, blues, oranges, and yellows, as well as lower chroma versions in many different hues. In recent decades, many of the best pigments for color-fastness and high chroma of color are no longer used in automotive quality coatings because of potential health concerns or regulatory considerations. Notably, cadmium, lead, and chromate pigments are generally no longer used. The substitutes for these pigments have shortcomings that have made development of high chroma colors or clean pastel colors difficult. The inorganic pigment candidates that are currently in use have good durability, but insufficient color intensity. In order to obtain high chroma colors, the more color-intense organic pigments are typically used. While the organic pigments provide sufficient chromaticity, they often do not provide sufficient opacity (also called hiding) for normal automotive or industrial coating requirements. The organic pigments, therefore, must be included in the coating at higher than desired levels and, usually, other more opaque pigments, which detract from the chroma, must also be employed to achieve a high chroma coating with sufficient hiding at the specified filmbuild.

While it is thus often necessary to include more pigment in the composition in order to obtain the desired color intensity, a lower pigment-to-binder ratio would be preferred for physical properties of the coating. Additionally, because the pigment combination at the chosen chroma may provide insufficient hiding, the coating composition may need to be applied at higher than ideal filmbuilds, resulting in added cost and potential problems such as sagging, solvent popping, and less than optimum properties for repairing defects. As evidenced by the above ASTM definition of a solid color, the metallic or mica flake pigments have generally only been included in automotive coatings when the gonioapparent effect or metallic effect was desired. Small amounts of uncolored aluminum flake pigment have been incorporated into a white basecoat to reduce, in part, the significant amount of titanium dioxide required for color and hiding. The addition of aluminum pigment was undesirable in that it reduced the chroma of the white basecoat, similar to other opacifiers such as carbon black.

It would be desirable, therefore, to be able to increase the opacity and/or improve the chromaticity of a straight-shade color at specified filmbuilds to avoid these problems. It would likewise be desirable to reduce the total amount of pigment required in order to provide a lower-cost coating having better physical properties.

SUMMARY OF THE INVENTION

The present invention provides a straight-shade color coating composition and the straight-shade color coating produced therefrom that include a colored metallic pigment, and preferably a colored aluminum pigment. In the coatings and compositions of the present invention, the colored metallic pigment is included at levels that are low enough so that no gonioapparent effects are produced in the coating. In addition, the colored metallic or colored aluminum flake pigment is selected to increase the chroma and, optionally, modify the hue for the same level of hiding or increase the hiding at the same chroma of the coating. In preferred embodiments of the invention, the colored metallic pigment is a colored aluminum pigment.

The coating compositions of the present invention may be formulated to provide hiding at lower filmbuilds and lower pigment to binder ratios without the loss of chroma associated with including previously-known opacifiers such as opaque titanium dioxide, opaque iron oxide, and black pigments. The invention allows formulation of stronger, purer colors and cleaner pastel colors that could otherwise not meet the automakers' specifications for hiding or formulation of colors at current chroma levels with less color pigment.

DETAILED DESCRIPTION

The straight-shade color coating composition of the present invention includes at least one colored metallic flake pigment, wherein the coating composition produces a coating having no noticeable gonioapparent effects.

For purposes of this invention, a straight-shade color or solid color is understood as a color that does not have a noticeable gonioapparent effect or metallic appearance. The degree of difference seen by the eye in lightness at an angle of 5 to 15 degrees off specular and at an angle of 75 to 110 degrees off specular for a metallic can be roughly quantified by measuring the $\Delta L^*$ for angles of illumination of 45° and 75° with a spectrophotometer. Coatings that have absolute values for $\Delta L^*$ of about 0.5 or less (i.e., between about +0.5 and −0.5) do not have an apparent metallic appearance, while coatings for which the absolute value of $\Delta L^*$ is from about 0.5 to about 0.6 may or may not have a visually detectable metallic appearance, depending upon the degree of chroma of the coating. Coatings for which the absolute value of $\Delta L^*$ between these angles is more than about 0.6 would generally be considered to be a metallic color. In addition, it is usually preferred that a straight shade color not have a visually detectable graininess, such as might result if aluminum flake is visually detectable but not present at sufficient levels or sufficiently oriented to produce a gonioapparent effect.

Preferably, the colored metallic flake pigment is a colored aluminum pigment. Including the colored metallic or aluminum pigment makes it possible to provide a color with increased chroma. By "increased chroma" we mean that the coating increased chroma with hiding at an equivalent filmbuild as compared to a previously known coating compositions of equivalent hue in which hiding at that filmbuild is achieved with non-colored aluminum opacifiers. Such previously used opacifiers include as titanium dioxide, opaque iron oxide, and carbon blacks. In addition to increasing the chroma, the colored aluminum pigment may also be used to modify the hue of the coating composition and coating produced therefrom.

Including the colored metallic or aluminum pigment also makes it possible to provide a coating and coating composition with increased hiding power. The hiding power of a coating is usually measured by applying the coating composition in a wedge of increasing thickness over a checkerboard chart, such as a black and white chart or a black and gray chart, and measuring the coating thickness at the point where the underlying chart can no longer be detected. By "increased hiding power," we mean that the coating compositions of the invention have better hiding, that is, hide at a lower filmbuild, when compared to previous coating compositions of similar hue and chroma that do not include a colored metallic or aluminum pigment. Alternatively, the increased hiding power may be manifested as being able to formulate the coating compositions of the present invention at a lower pigment-to-binder ratio for the same filmbuild needed for hiding as compared to previous coating compositions. For example, the colored aluminum pigment can replace not only previously used opacifiers but also part of the masstone pigment to make a coating composition that has the same chroma at the desired filmbuild for hiding but which then has a lower pigment-to-binder ratio.

Metallic flake pigments are known in the art and include flake pigments of aluminum, copper, bronze, zinc, stainless steel, and so on. Metallic flake pigments may be colored according to methods known in the art. The colored metallic flake pigment is preferably a colored aluminum pigment. While the description of the invention will usually make specific reference to colored aluminum pigments, for the reason that colored aluminum pigment is commercially available in a number of colors and is the predominant colored metallic flake pigment used in the manufacture of coating compositions, it should be understood that other colored metal flake pigments could be employed in the same manner. Colored aluminum flake pigment used in automotive coatings is preferably colored non-leafing aluminum pigment.

In general, metallic flake pigments are grouped according to different grades of fineness. Generally, such pigments are classified as coarse, medium, or fine. In the present invention, fine grades of aluminum pigment are preferably used in order to get more hiding with a lower weight percent of aluminum pigment in the composition. In addition, gonioapparent effects manifest at lower levels for larger size flakes as compared to finer flakes. Fine flake pigments may be characterized as having an average diameter of about 30 microns or less. Preferably, the aluminum pigment has an average diameter of about 25 microns or less, more preferably about 20 microns or less, even more preferably about 15 microns or less, and particularly preferably about 10 microns or less. The aluminum pigment should have a particle size distribution narrow enough so that no metallic effect is produced in the coating composition at the level employed.

In addition, flake pigments may be of different shapes. In manufacture of aluminum flake pigments, liquid aluminum may be atomized and solidified into individual pellets. A pellet may then milled or processed to yield either several thin, crinkled flakes ("corn flake"-shaped flakes) or one thicker, rounder, flat flake ("silver dollar"-shaped flake). Corn flake-shaped flakes are cheaper, less gonioapparent, thinner, more prone to degradation, and orient more randomly in the coating film layer as compared to the silver dollar-shaped flake. The corn flake-shaped flake also tends to refract and scatter light more than the silver dollar-shaped flake. The thinner, more random, more refractive corn flake-shaped flakes are preferred because they provide more hiding per gram and may be included in the coating at higher levels without producing any noticeable gonioapparent effect. Other shapes and/or methods of manufacture may, of course, be employed. Metallic flake pigments may be prepared by grinding fine pieces or granules of metal by a mechanical means, for example, in a stamp mill, dry-type ball mill, wet-type ball mill, or vibrating ball mill. Further aspects of manufacture of metallic flake may be found in the literature, for example in U.S. Pat. No. 4, 565,716, issued Jan. 21, 1986 to Williams, Jr. et al.

Color may be imparted to the metallic or aluminum pigment by any of the different methods known in the art. For example, the pigment may be vapor deposited on the surface of the aluminum flake. The colored pigment flake may be encapsulated in a resin layer. In another method, the color may be provided to the flake by an oxidation process of the surface of the aluminum, for example by anodization. Nadkarni, U.S. Pat. No. 5,261,955, for example, discloses a process for coloring metal flakes such as aluminum flake pigments with a sol-gel coating that includes an inorganic metal oxide color pigment. Schmid and Mronga, U.S. Pat. No. 5,662,738, describe coating metallic pigment with a three-layer coating with first and third layers of colorless or selectively absorbing metal oxide and a second layer of nonselectively absorbing carbon, metal, or metal oxide.

The metallic flake pigment may be colored using virtually any organic or inorganic color pigment. In particular, aluminum pigment may be colored any hue, including red, blue, green, yellow or gold, orange, violet, white, or black. Examples of suitable classes of organic pigments that may be used include, without limitation, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows, benzimidazolone yellows, tolyl orange, naphthol orange, and quinophthalone pigments. Examples of useful color pigments include, without limitation, quinacridone pigments, such as C.I. Pigment Red 202, C.I. Pigment Violet 19, and C.I. Pigment Red 122; perylene pigments, such as C.I. Pigment Red 179; azo condensation pigments, such as C.I. Pigment Red 170, C.I. Pigment Red 144, and C.I. Pigment Brown 23; isoindolinone pigments, such as C.I. Pigment Orange 61, C.I. Pigment Yellow 109, and C.I. Pigment Yellow 110; diketopyrrolopyrrole pigments, such as C.I. Pigment Red 254, C.I. Pigment Red 255, C.I. Pigment Red 264, C.I. Pigment Orange 71, and C.I. Pigment Orange 73; copper phthalocyanine pigments such as C.I. Pigment Blue 15; and anthraquinone pigments, such as C.I. Pigment Blue 60, C.I. Pigment Red 177, and C.I. Pigment Yellow 147.

The aluminum pigments may also be colored using inorganic pigments. Examples of suitable inorganic pigments include, without limitation, oxide pigments such as titanium dioxide, carbon black, iron oxides including red iron oxide, black iron oxide, and brown iron oxide, chromium oxide green, ferric ferrocyanide (Prussian blue), ultramarine, lead chromate, and so on.

The particular pigment selected for coloring the aluminum flake is selected according to the color and properties desired as is known in the art.

Colored aluminum pigments are commercially available from several companies, including BASF Corporation, Mt. Olive, N.J. under the tradename PALIOCROM; Eckart, in the Federal Republic of Germany, under the tradenames ALUCOLOR and ALOXAL; U.S. Aluminum, Inc., Flemington, N.J.; Showa. in Japan; Toyo Aluminum KK, Higashiku, Osaka, Japan; and Silberline Manufacturing Co., Inc., Tamaqua, Pa.

The coating compositions of the invention also include at least one color pigment. Examples of color pigments include, without limitation, those inorganic and organic pigments listed above as suitable for coloring the metal flake pigment. The color pigments are selected and combined according methods well-known in the art. In general, the color pigments are dispersed in a pigment paste before being added to the coating composition. Typically, a pigment paste includes a resin or dispersant, one or more pigments, and a liquid medium such as an organic solvent or water along with a polar cosolvent.

The invention may be used to prepare any color of coating. In the coatings art, the available color space can be regarded as divided into sectors in which the colors are generally red, orange, yellow, cyan, green, blue, and purple. By "generally" we mean to include all colors that would be considered to be within the given color sector. For example, colors that are generally red would include blue-shade reds and yellow-shade reds, colors that are generally yellow would include green-shade yellows and red-shade yellows, and so on. Of course, there would be a boundary between the sectors, so that, for example, red-shade yellows and yellow-shade oranges be next to one another. The invention can be used to prepare colors of any hue, for example colors that are generally red, generally orange, generally yellow, generally cyan, generally green, generally blue, and generally purple, as well as whites and blacks. The invention is particularly useful for preparing, clean, high chroma colors.

As previously mentioned, the aluminum pigment may be selected not only to provide increased hiding power, but also to increase chroma and/or to modify the hue of the coating. The aluminum pigment may increase the chroma at the same hue or may shift the hue as well as increasing the chroma. For example, STAPA ALOXAL PM 3010 aluminum, an anodized, beige-colored aluminum available from Eckart, may be added to a yellow composition colored with a semi-opaque, inorganic yellow such as bismuth vanadate to obtain bright, chromatic green-shade yellows. For yellow compositions colored with semi-opaque, inorganic red- or blue-shade yellow, including SBT 353YG, a yellow-colored aluminum available from Silberline produces a bright, green-shade yellow with improved hiding and chroma. PALIOCROME L2022, a gold-colored aluminum flake available from BASF Corporation, can be used with red compositions including DPP, quinacridone, and iron oxide pigments to produce bright, chromatic yellow-shade reds with improved hiding or with yellow compositions including semi-opaque inorganic yellows such as bismuth vanadate to produce bright, chromatic red-shade yellows. Other red compositions that include DPP, quinacridone, and iron oxide pigments may be modified with PALIOCROME L2800, an orange-colored aluminum flake available from BASF Corporation, to produce a bright, chromatic true-to-yellow-shade red; or with a red-colored aluminum pigment such SBT 554RD available from Silberline or 97-4071 RE from Toyo to produce a bright, chromatic blue-shade reds. Blue compositions including phthalocyanine, indolinone, and inorganic blue pigments and mixtures of these with white pigments, may be shifted to bright blue with increased hiding and decreased UV transmissivity by addition of a blue-colored aluminum pigment such as Toyo's 97 4077 BL. Other colors may similarly be shifted in hue with a compatible colored aluminum.

The aluminum pigment may be stirred directly into the coating composition; however, it is usually slurried in a solvent or resin solution before being added. The aluminum pigment is added in an amount sufficient to increase the hiding power or chroma of the composition, but in an amount small enough so that the coating does not exhibit gonioapparent effect, i.e., the color is not a metallic color. Usually, then, the aluminum flake pigment will be included in an amount of about 3% or less, preferably about 2.5% or less, still more preferably about 2%, based on the total weight of the color pigments. By "total weight of the color pigments" we mean to include all materials that are customarily thought to add to the color of the coating composition. These materials include primarily the color pigments and flake pigments. We mean to exclude from this calculation other insoluble ingredients of the coating composition such as extenders or Theological additives like clays or silicates.

The colored aluminum pigment and color pigments are usually used in the composition in an amount of about 0.25% to about 110%, based on the total solid weight of binder components (i.e., a color pigment-to-binder ratio of about 0.025 to about 1.1).

The coating compositions of the present invention may be used, for example, as original finish (OEM) or refinish coatings for automotive vehicles.

The coating compositions of the present invention may include any suitable resin or combination of resins. Preferably, automotive coating compositions are thermosettable. Such compositions may include a self-curing or selfcrosslinking resin, but usually include one crosslinkable resin that has at least two crosslinking groups and one crosslinking agent or curing agent that has more than two groups reactive with the crosslinkable resin. Useful examples of crosslinkable functional groups include, for example and without limitation, hydroxy, isocyanate, amine, oxirane (epoxide), ethylenically unsaturated, silane, acid, terminal carbamate or urea, and acetoacetate groups. Illustrative examples of resins include, without limitation, acrylics, vinyls, polyurethanes, polyesters, alkyds, polycarbonates, polysiloxanes, and epoxy resins. Preferred resins include acrylics and polyurethanes. The resin may be an aqueous dispersion or may be a water-dispersible resin. Examples of water-dispersible polymers suitable for topcoats are contained in U.S. Pat. Nos. 4,794,147; 4,791,168; and 4,518,724. Illustrative examples of crosslinking agents include, without limitation, aminoplast resins such as melamine-formaldehyde resins, polyamines, polyacids, polyepoxides, polyisocyanates, and blocked polyisocyanates. The crosslinking agent is, of course, selected to have groups reactive with the crosslinkable functional groups on the resin.

The coating composition of the present invention preferably also includes a solvent. This solvent should act as a solvent with respect to the components of the composition. In general, the solvent can be any organic solvent and/or water. In one preferred embodiment, the solvent is an organic solvent and the coating composition is a solventborne coating composition. Preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, amyl acetate, ethylene glycol monobutyl ether acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents. Suitable co-solvents for water-borne systems are well-known in the art and include, for example, ethylene and propylene glycol ethers and ether acetates, alcohols, and N-methylpyrrolidone.

A thermoset coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

Other ingredients commonly added to coating compositions may be included in the present compositions. Commonly added materials include, for example, surfactants, fillers, stabilizers, wetting agents, dispersing agents, adhesion promoters, UV absorbers, HALS, rheology control agents, plasticizers, and so on.

The coating compositions of the invention can be coated on the article by any of a number of techniques well-known in the art. These include, for example, spray coating, dip coating, roll coating, curtain coating, and the like. For automotive body panels, spray coating is preferred.

The coating composition according to the invention is preferably utilized in a high-gloss single-layer topcoat coating and/or as the basecoat of a high-gloss composite color-plus-clear coating. High-gloss coatings as used herein are coatings having a 200 gloss (ASTM D523-89) or a DOI (ASTM E430-91) of at least 80. A single-layer topcoat coating may have a filmbuild of from about 0.5 mil to 3.5 mils, preferably from about 1.4 mils to about 2.8 mils, and particularly preferably from about 1.5 mils to about 2.5 mils.

When the coating composition according to the invention is used as the basecoat of a composite color-plus-clear coating, the clearcoat composition may be any of a number of types well-known in the art, and does not require explanation in detail herein. Clearcoat polymers may be thermoplastic, but are preferably crosslinkable and comprise one or more type of crosslinkable functional groups such as those mentioned above. Polymers and crosslinking agents known in the art to be useful in such compositions include those mentioned above in connection with the resin and crosslinking agent of the color coating compositions of the invention. Preferred polymers include acrylics and polyurethanes. In one preferred embodiment of the invention, the clearcoat composition utilizes a carbamate-functional acrylic polymer.

A basecoat coating may have a filmbuild of from about 0.4 mil to 2.0 mils, preferably from about 0.4 mils to about 1.5 mils, and particularly preferably from about 0.5 mils to about 1.2 mils. A clearcoat coating may have a filmbuild of from about 0.5 mil to 3.5 mils, preferably from about 1.4 mils to about 2.8 mils, and particularly preferably from about 1.5 mils to about 2.5 mils.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The first compounds according to the present invention are preferably reactive even at relatively low cure temperatures. Thus, in a preferred embodiment, the cure temperature is preferably between 115° C. and 150° C., and more preferably at temperatures between 115° C. and 138√ C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. The examples are merely illustrative and do not in any way limit the scope of the invention as described and claimed. All parts are parts by weight unless otherwise noted.

EXAMPLES

All percentages are by weight.
Straight Shade Basecoat Compositions

Various basecoat coating compositions were prepared. The basecoat was a solventborne compositions with a vehicle of an acrylic resin and melamine-formaldehyde crosslinking agent. The color pigmentation and color pigment-to-binder ratios are given in the following Table. Examples 1–3 are examples of the invention, while Examples A–C are comparative examples.

The filmbuild necessary to obtain hiding was determined for each basecoat composition according to test method TF022 using a black and white chart. The basecoat compositions were then applied to a primed aluminum panel at a filmbuild sufficient for hiding. The basecoat was allowed to flash (dry) for about 2 minutes, and then a commercial high solids clearcoat composition available from BASF Corporation, Southfield, Mich.) was applied over the basecoat at a thickness between about 1.8 and 2.0 mils and the panel was cured for about 30 minutes at about 250° F.

The coated panels were evaluated by measuring the $\Delta L^*$ between angles of illumination of 45° and 75° using an X-Rite spectrophotometer. Results of the testing are given in the Table.

| Example | Pigmentation | P/B | mils film at hiding | $\Delta L^*$ (45° to 75°) | color shift from masstone |
|---------|--------------|-----|---------------------|---------------------------|---------------------------|
| 1 | 98% L1112, 2% L2020 | 1.0 | 1.0 | 0.03 | redder |
| 2 | 98% L1112, 2% Aloxal 3010 | 1.0 | 1.1 | 0.13 | greener |
| A | 100% L1112 | 0.66 | 5.0 | 0.05 | (masstone) |
| B | 98% L1112, 2% 7000 AR | 1.0 | 0.7 | 0.38 | grayer and greener |
| 3 | 98% of pigmentation I 2% of 97-4071 RE | 0.25 | 0.7 | | more chromatic red as compared to Example C |
| C | 100% of pigmentation I | 0.25 | 1.1–1.2 | | |

L1112 is a bismuth vanadate pigment available from BASF Corporation.
L2020 is a colored aluminum available from BASF Corporation. Aloxal 3010 is a colored aluminum available from Eckart.
7000 AR is an aluminum pigment available from Silberline.
Pigmentation I for Example 3 and Comparative Example C is as follows: 8.5 parts by weight of Red BO from Ciba Geigy Corp., a red diketopyrrolopyrrole pigment; 6.67 parts by weight of F2RK70 from BASF Corp., a red diketopyrrolopyrrole pigment; 5.9 parts by weight of quinacridone magenta; 2.2 parts by weight of opaque red oxide; and 2.16 parts by weight of titanium dioxide.
97-4071 RE is a colored aluminum available from Toyo Aluminum.

The invention has been described in detail with reference to preferred embodiments thereof. It should be understood, however, that variations and modifications can be made within the spirit and scope of the invention.

What is claimed is:

1. A straight-shade color coating composition comprising at least one colored metallic flake pigment, wherein the coating composition produces a coating having no noticeable gonioapparent effects.

2. A coating composition according to claim 1, wherein the colored metallic flake pigment is a colored aluminum pigment.

3. A coating composition according to claim 2, wherein the aluminum pigment increases the chroma of the coating composition.

4. A coating composition according to claim 2, wherein the aluminum pigment changes the hue of the coating composition.

5. A coating composition according to claim 1, wherein the coating composition is a solventborne basecoat coating composition.

6. A coating composition according to claim 1, wherein the coating composition is a waterborne basecoat composition.

7. A coating composition according to claim 1, wherein the coating composition is a topcoat composition for a single-layer topcoat.

8. A coating composition according to claim 2, wherein the colored aluminum pigment has an average diameter of about 30 microns or less.

9. A coating composition according to claim 2, wherein the colored aluminum pigment has an average diameter of about 25 microns or less.

10. A coating composition according to claim 2, wherein the colored aluminum pigment has an average diameter of about 20 microns or less.

11. A coating composition according to claim 2, wherein the colored aluminum pigment has an average diameter of about 15 microns or less.

12. A coating composition according to claim 2, wherein the colored aluminum pigment has an average diameter of about 10 microns or less.

13. A coating composition according to claim 2, wherein the colored aluminum is no more than about 3% by weight of total weight of color pigments.

14. A coating composition according to claim 2, wherein the colored aluminum is no more than about 2.5% by weight of total weight of color pigments.

15. A coating composition according to claim 2, wherein the colored aluminum is no more than about 2% by weight of total weight of color pigments.

16. A coating composition according to claim 1, wherein the coating composition has a blue color.

17. A coating composition according to claim 1, wherein the coating composition has a red color.

18. A coating composition according to claim 1, wherein the coating composition has a yellow color.

19. A coating composition according to claim 1, wherein the coating composition has an orange color.

20. A coating composition according to claim 1, wherein the coating composition has a green color.

21. A coating composition according to claim 1, wherein the coating composition has a cyan color.

22. A coating composition according to claim 1, wherein the coating composition has a purple color.

23. A coating composition according to claim 1, wherein said composition comprises at least two different colored aluminum pigments.

24. A coating composition according to claim 1, wherein said composition is an original finish coating composition for automotive vehicles.

25. A coating composition according to claim 1, wherein said composition is a refinish coating composition for automotive vehicles.

26. A substrate coated with a straight-shade color coating comprising a colored metallic pigment.

27. A coated substrate according to claim 26, wherein the colored metallic flake pigment is a colored aluminum pigment.

28. A coated substrate according to claim 27, wherein the aluminum pigment increases the chroma of the coating composition.

29. A substrate according to claim 27, wherein the colored aluminum is no more than about 3% by weight of total weight of color pigments.

30. A substrate according to claim 27, wherein the colored aluminum is no more than about 2% by weight of total weight of color pigments.

31. A coated substrate according to claim 26 having a red color.

32. A coated substrate according to claim 26 having a yellow color.

33. A coated substrate according to claim 26 having a blue color.

34. A coated substrate according to claim 26 having an orange color.

35. A coated substrate according to claim 26 having a green color.

36. A coated substrate according to claim 26 having a cyan color.

37. A coated substrate according to claim 26 having a purple color.

* * * * *